Patented Jan. 25, 1938

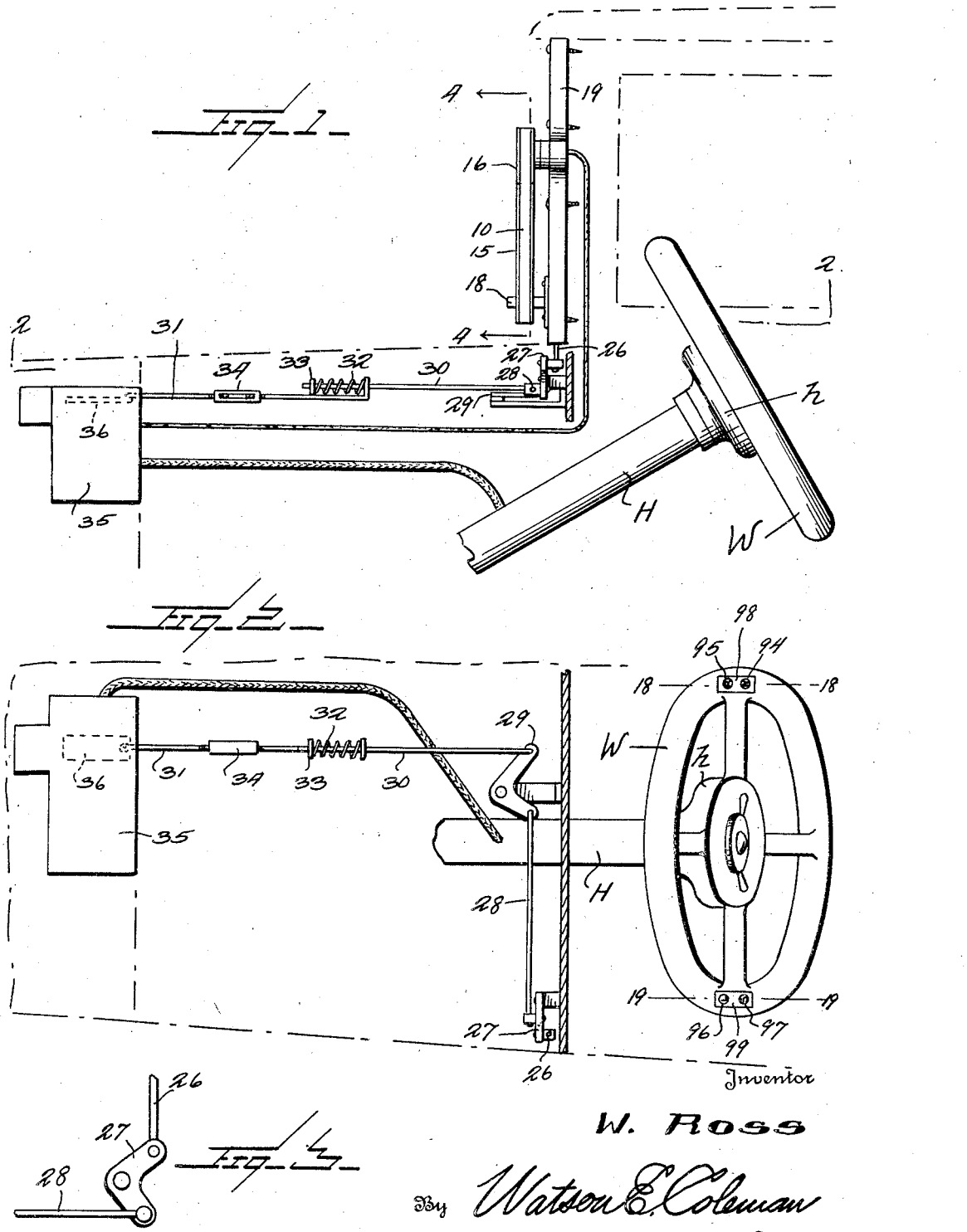

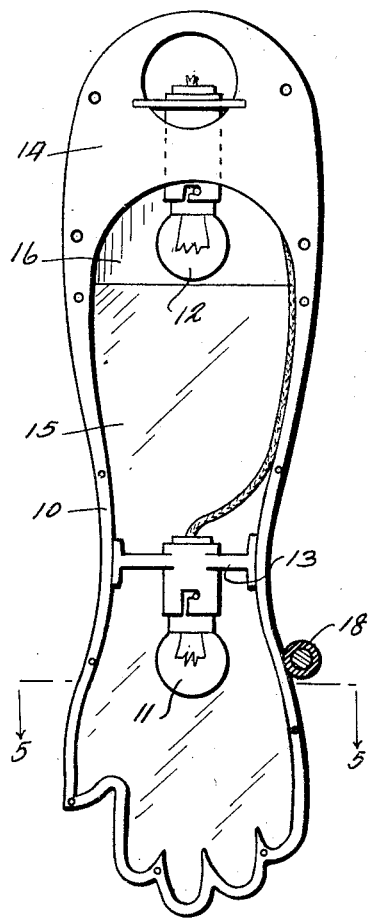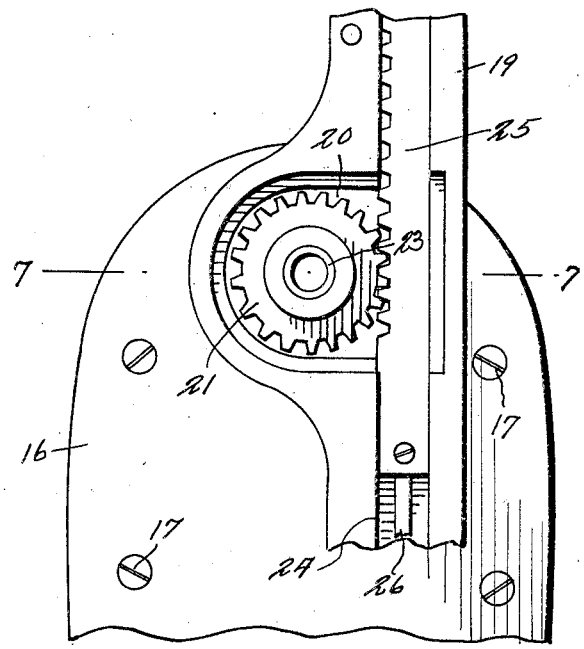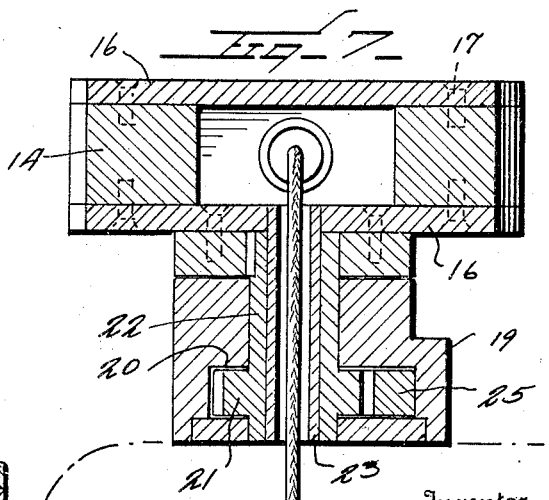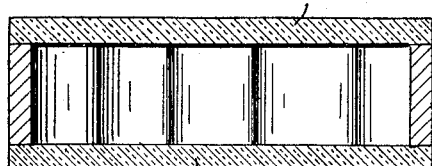

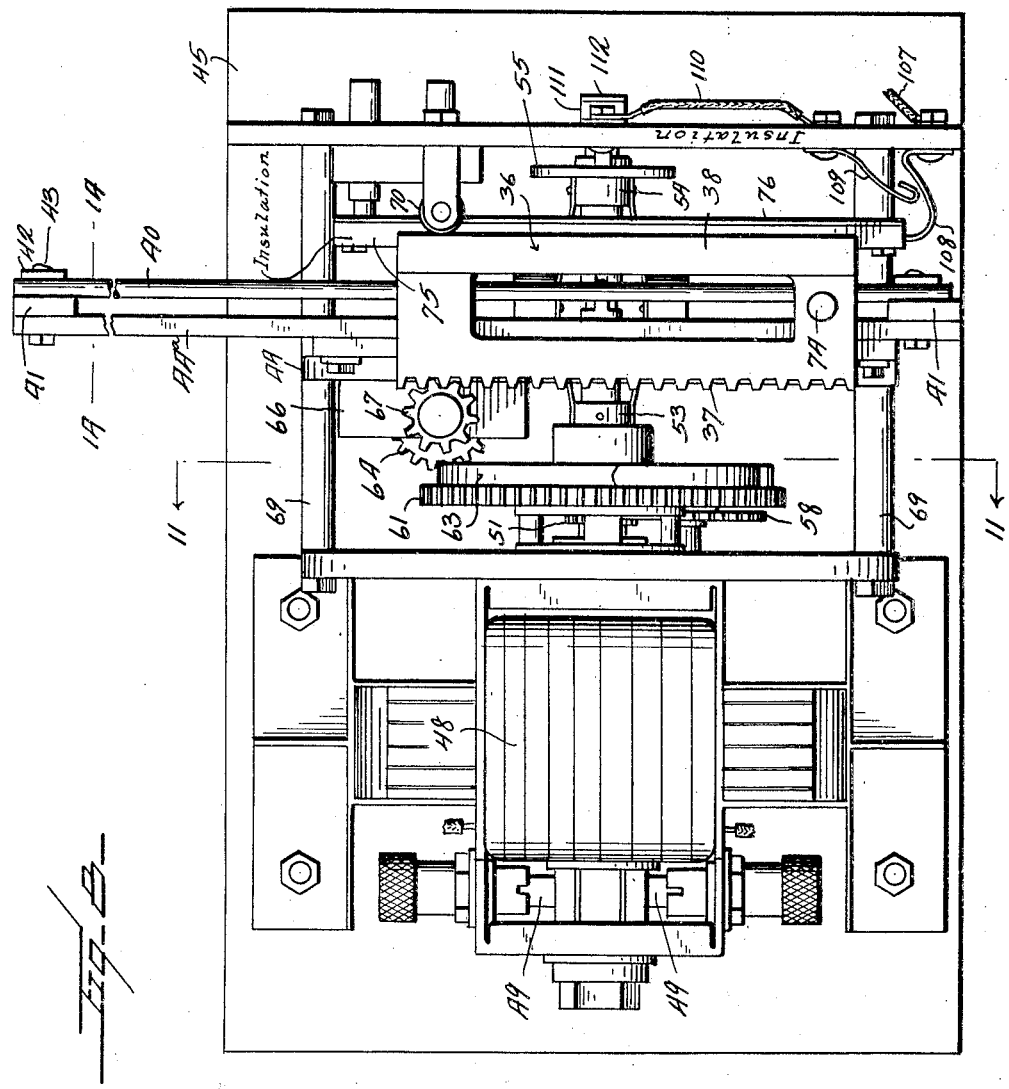

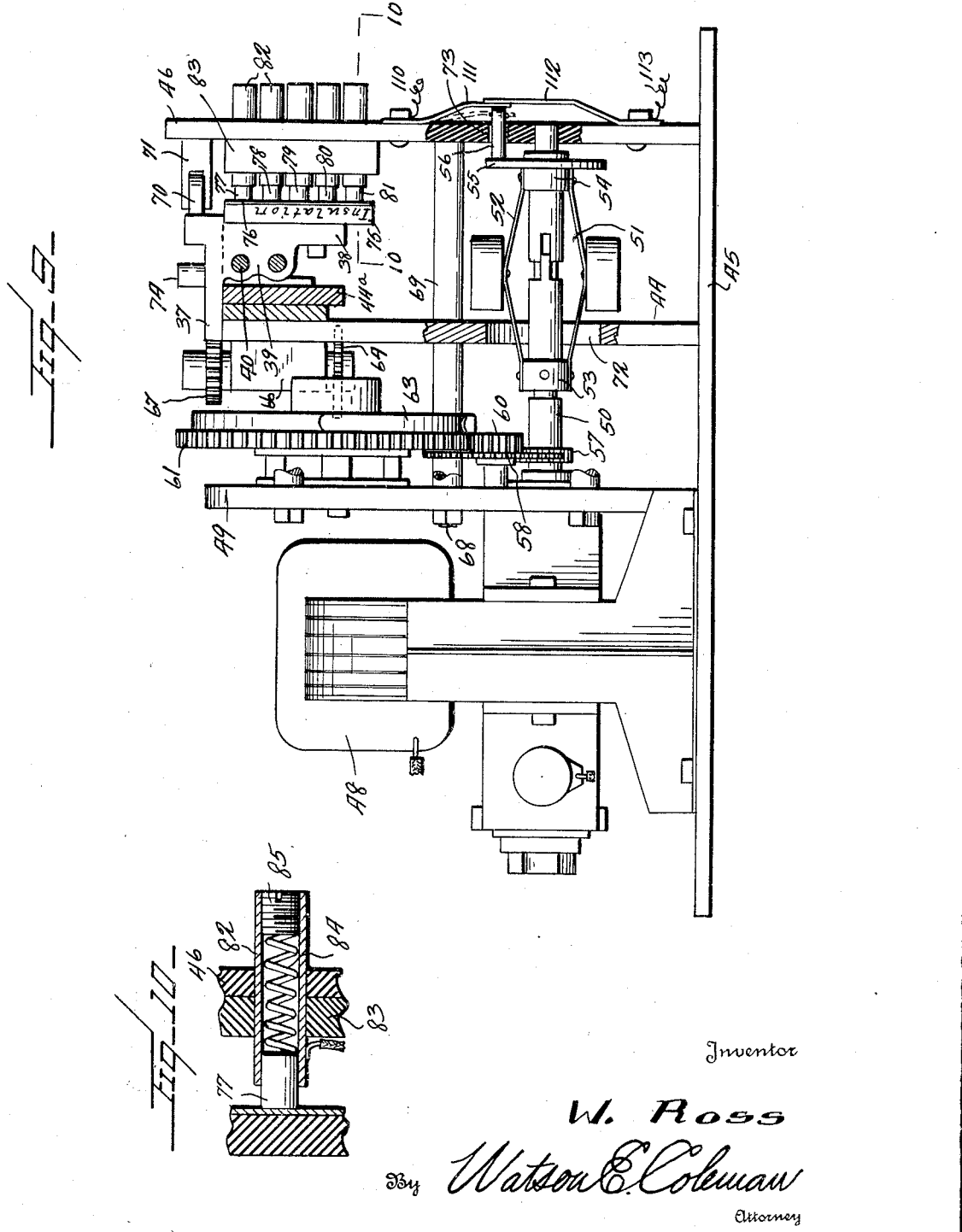

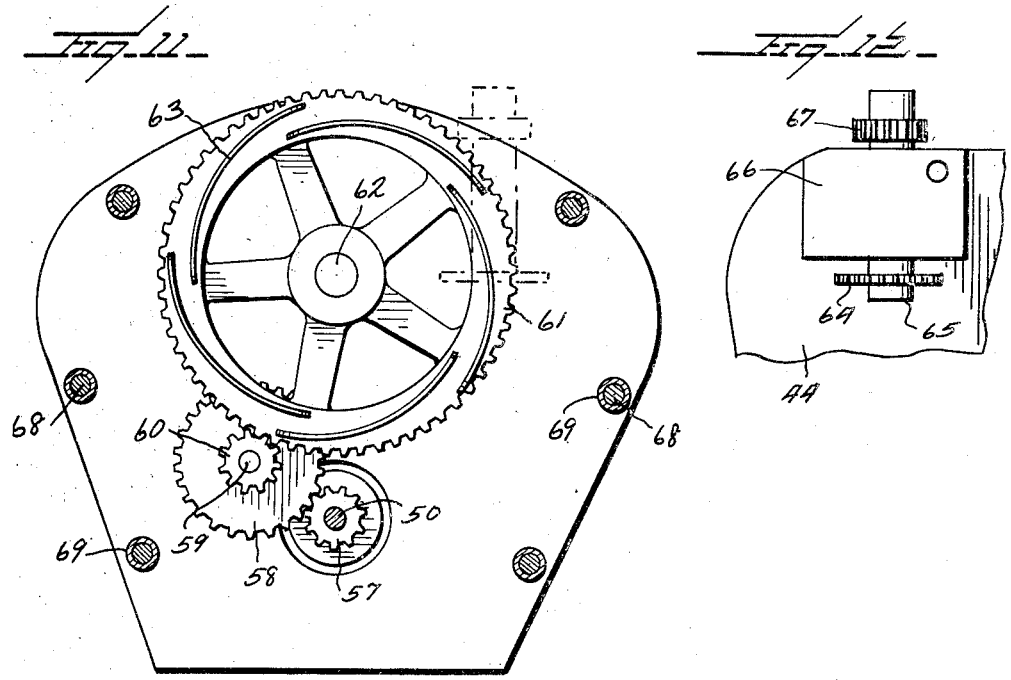
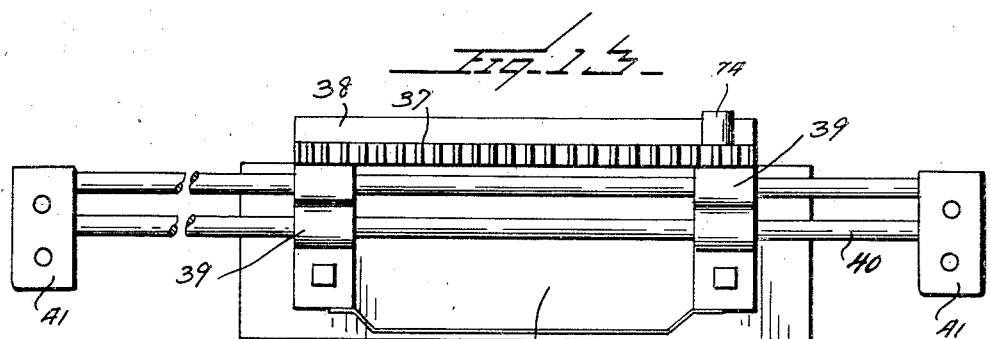
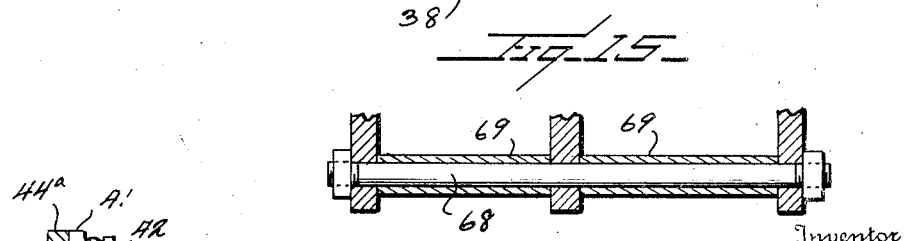
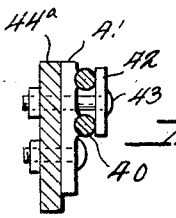

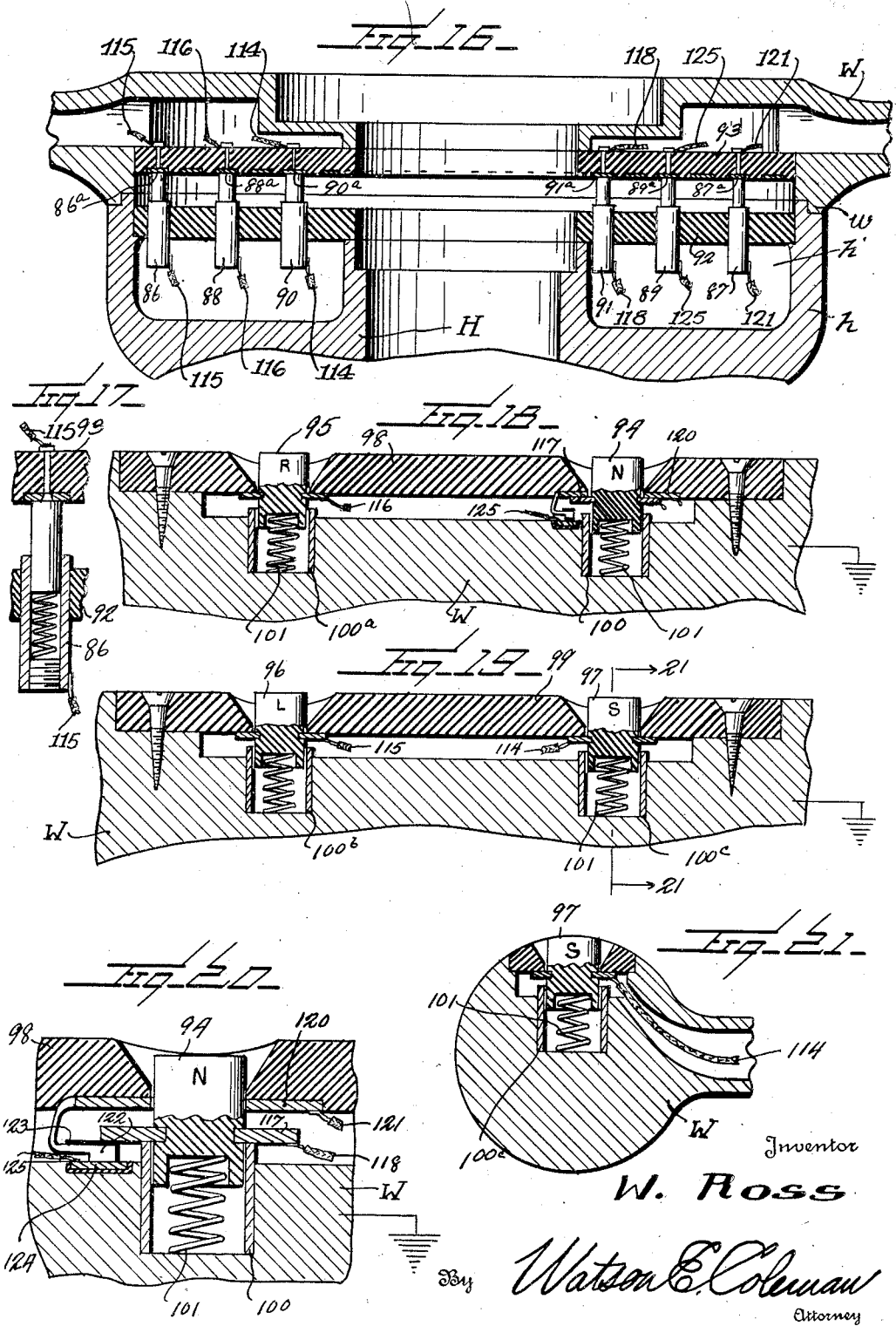

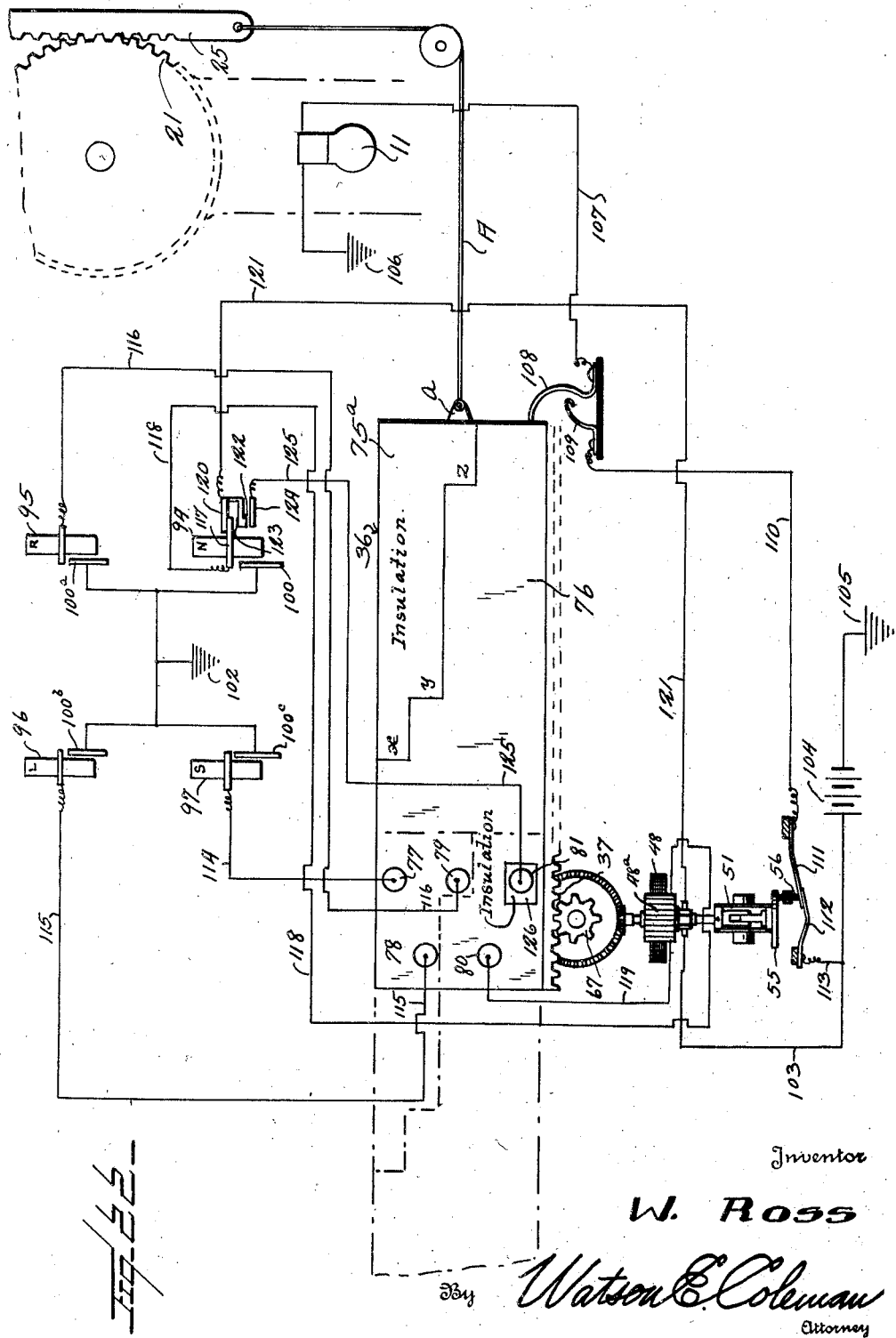

2,106,660

UNITED STATES PATENT OFFICE 2,106,660

DIRECTION SIGNAL FOR AUTOMOBILES

William Ross, San Diego, Calif., assignor of one-third to Bernard F. J. Storton, San Diego, Calif.

Application June 6, 1935, Serial No. 25,337

3 Claims. (Cl. 177—327)

This invention relates to automobile signals and particularly to means for operating a signal arm and shifting it from a normal position to positions indicating "slow", "left turn" or "right turn".

The general object of the invention is to provide motor operated means for raising or lowering the arm to or from the three several positions noted and means for automatically energizing an electric lamp or lamps carried by the arm when the arm has come to its indicating position, these lamps, of course, being automatically de-energized when the arm starts to return from an indicating position to a normal position.

A further object in this connection is to provide the light circuit with two switches and provide a motor operated governor controlling one of these switches, and provide means operated in coincidence with the movement of the arm for closing the other of these switches, the operation of the motor, which acts to shift the arm, acting to open the governor control switch until such time as the motor is automatically stopped with the arm raised to the desired indicating position or lowered to its neutral position.

Other objects will appear in the course of the following description.

My invention is illustrated in the accompanying drawings wherein:

Figure 1 is a side elevation of a portion of a motive vehicle showing in side elevation the signalling mechanism and the steering wheel with its column or housing, the car being shown in dotted lines;

Figure 2 is a horizontal section on the line 2—2 of Figure 1;

Figure 3 is a detail view of one of the bell cranks which operate the arm from the motor;

Figure 4 is a face view of the arm, the covering plate being removed;

Figure 5 is a section on the line 5—5 of Figure 4, with the covering plate in place;

Figure 6 is an elevation of the rear end of the arm and of a portion of the actuating mechanism therefor;

Figure 7 is a section on the line 7—7 of Figure 6;

Figure 8 is a top plan view of the motor and the mechanism operated thereby and controlling the operation of the arm;

Figure 9 is an elevation of the mechanism shown in Figure 8 partly in section;

Figure 10 is a section on the line 10—10 of Figure 9 showing in detail one of the contact members;

Figure 11 is a section on the line 11—11 of Figure 8;

Figure 12 is a detailed fragmentary elevation of the intermediate gearing between the motor gear wheel and the rack;

Figure 13 is an elevation of the rack, the contact plate carried thereby, and the rails upon which the contact plate travels;

Figure 14 is a section on the line 14—14 of Figure 8;

Figure 15 is a fragmentary detailed sectional view of the means for connecting and spacing the three plates of the supporting frame shown in Figure 8, from each other;

Figure 16 is a sectional view through the hub of the steering wheel and the supporting column showing the contacts therein;

Figure 17 is an enlarged sectional view through one of the contacts shown in Figure 16;

Figure 18 is a section on the line 18—18 of Figure 2;

Figure 19 is a section on the line 19—19 of Figure 2;

Figure 20 is an enlarged fragmentary section of a portion of the steering wheel rim on the same section line as Figure 18, but showing the neutral button in a depressed position;

Figure 21 is a section on the line 21—21 of Figure 19;

Figure 22 is a diagrammatic view of the mechanism and of the wiring control buttons and other parts.

The signal arm is illustrated in Figure 4. It is in the form of an arm with an indicating hand, though it may have any other desired form. The outline of the signal arm is formed by a metallic frame designated 10 and defining a chamber within the frame within which the signal lamps 11 and 12 are disposed. As illustrated in Figure 4, the base of the lamp 11 is mounted upon a transverse cross bar 13. The base of the lamp 12 is mounted in the rear portion 14 of the frame, this rear portion being covered by the plates 15 and 16, the plate 15 being removed in Figure 4. These plates are held in place by the screws 17 or like means. The signal arm is pivotally mounted at its upper end and when the arm is in its neutral position, as shown in Figures 1 and 4, the arm bears against a stop having a rubber sleeve 18.

Mounted upon the front of the car at the left hand side thereof above the hood is a vertically disposed casing 19, shown in Figures 1 and 6. This casing at its upper end is formed with a chamber 20, as shown in Figures 6 and 7, within which is disposed a gear wheel 21 having an elongated tubular hub 22 through which passes a sleeve 23 attached to the arm. It is to be understood, of course, that the sleeve 23 and the gear wheel 21 rotate together. Disposed in a vertical passageway 24 formed in this casing 19 is a rack bar 25 having teeth engaging the gear wheel 21. This rack bar 25 is guided for vertical movement within the guideway 24 and at its lower end is connected to a push and pull rod 26. This rod in turn is connected to a bell crank lever 27 which is connected by a horizontal rod 28 to a horizontally disposed bell crank lever 29 from which a connecting rod extends. This rod is made in sections, as shown in Figure 1, the section 30 extending through the angular end of a section 31 and being provided with a spring 32 disposed between the angular end of the rod 31 and stop 33 on the rod 30, thus cushioning the action of the rod section 30 upon the rod section 31. The rod section 31 is provided with a turnbuckle 34 whereby the length of the rod section 31 may be adjusted.

The rod section 31 enters a casing 35 which contains the slide which controls the action of the motor and which is operated by the motor. This slide is shown diagrammatically in Figure 22 and is designated 36. In Figure 22, I have shown the rack 25 as being connected to the slide 36 by means of a cable A, but this cable is a diagrammatic representation or equivalent of the push and pull rods 28, 30 and 31, as in a diagrammatic view such as that shown in Figure 22, it would be difficult to show the push and pull rods and the bell crank levers.

The slide 36, as shown in Figures 8, 9 and 13, comprises a rack 37 shown as disposed in a horizontal plane and a plate 38 disposed in a vertical plane, the rack and plate being engaged with each other by any suitable means. Mounted upon the plate 38, which plate is partly of insulation and partly of metal, as will be later described, are a plurality of brackets 39, which may be formed as part of the rack 37, these brackets having passages through which guide rods 40 pass. There are two of these guide rods 40, one disposed above the other, as shown in Figure 9. These guide rods at their ends are engaged by clamping elements 41 and 42, a bolt 43 passing through these clamping elements and through a supporting plate 44ᵃ mounted on a wall 44 extending upward from the base 45, upon which the motor and allied parts are mounted, as shown in Figure 9. The clamping elements are shown in detail in Figure 14.

Extending parallel to the wall 44 is a vertical wall 46 and on the other side of the wall 44 and parallel thereto is a vertical wall 47. The motor 48 is mounted upon the base 45 in any suitable manner, the motor having the usual brushes 49. The motor is a reversible motor. Inasmuch as the motor may be of any suitable ordinary construction and is of well known form, there is no necessity of describing the motor. The shaft 50 is driven by the motor and carries upon it a centrifugal governor designated generally 51. The spring leaves 52 of this governor are mounted upon a fixed collar 53 at one end and at the other upon a shiftable collar 54, which carries thereon a plate 55 having an outwardly extending pin 56 which passes through an aperture in the wall 46 for the purpose of engaging a switch. The end of the motor shaft 50 is mounted in bearings in the wall 46.

As illustrated in Figure 11, the motor shaft 50 carries upon it a pinion 57, which engages with a gear wheel 58 mounted upon a shaft 59 carrying upon it the pinion 60 which in turn engages with a relatively large gear wheel 61 mounted upon a shaft 62. The face of this gear wheel carries upon it a plurality of arcuately curved helically disposed teeth 63, as shown in Figure 11, each tooth starting adjacent the periphery of the gear wheel 61 and curving inward toward the inner margin of the gear wheel rim. The extremity of one tooth extends beyond the adjacent extremity of the next adjacent tooth. These teeth 63 are adapted to engage with the teeth of a pinion 64 mounted upon a vertical shaft 65 carried by a boxing 66 mounted upon the wall 44, as shown in Figure 12. It will be seen that a rotation of the wheel 61 will give a slow but constant rotation to the shaft 65 through the action of the teeth 63 upon the teeth of the pinion 64. Mounted upon the shaft 65 is a pinion or gear wheel 67 which engages the teeth of the rack 37, as shown in Figure 8. Thus, when the motor is energized and rotates in one direction, the slide designated generally 36 will be shifted in one direction, and when the motor is reversed, the slide will be shifted in the other direction along the track 40. The three walls or plates 46, 44 and 47 are connected to each other by the bolts 68, as shown in Figure 15, and separated from each other by the sleeves 69 which surround the bolts. The slide 36 formed of the members 37 and 38 is held with its rack teeth in engagement with the pinion 67 by means of one or more wheels 70, one of these wheels being shown, and this wheel being mounted upon a bracket 71 carried by the wall 46. This wall 46 is formed of insulating material, as indicated in Figures 8 and 9. The intermediate wall 44 is cut away at 72 for the passage of the governor shaft 50 and the springs 52 of the governor. The wall 46 is apertured at 73 for the passage of the switch operating pin 56, as shown in Figure 9. The rod section 31 shown in Figure 2 is connected to the slide 36 by means of the stud 74 in Figure 8. In Figure 22, the equivalent of this stud has been shown in the bracket and pin connection designated a connected to the cable A.

The outer face of the plate 38 is recessed and set into this recess and extending downward below the plate 38 is a plate 75 which is shown as of insulating material. Mounted upon the face of this plate 75 is a metallic facing 76 which is cut away at 77, so that at this cut away corner of the metallic facing 76, the insulation 75 is disclosed. Of course, it is to be understood that the face of this disclosed portion of the insulation is flush with the face of the metallic facing plate 76. Obviously, the insulation could be set into a metallic plate instead of the metallic plate being set into an insulating backing. Mounted upon the wall 46 of insulating material and extending through this wall are five brushes, one of which is shown in Figure 10. These brushes are designated 77, 78, 79, 80 and 81, respectively. Each of these brushes, as shown in Figure 10, for the brush 77, is mounted in a metallic sleeve 82 extending through the wall 46 and through a supporting member 83 of insulating material. Each brush is pushed outward by means of the spring 84, whose tension is adjustable by means of the adjustable plug 85 having screw threaded engagement with the interior of the sleeve. The respective wires from these brushes are attached to the respective sleeves in the manner shown in Figure 10. It will be seen from Figure 22 that the brushes 77, 79 and 81 are arranged in a vertical line and that the brushes 78 and 80 are disposed intermediate the brushes 77, 79 and 81, but to one side thereof. It will be seen that the brushes 77, 78 and 79 coact with the three steps formed on the lower edge of that portion 75ᵃ of the insulation 75, which is disclosed by cutting away the metallic plate, as at 77. Thus, the brush 77 travels across the zone marked $x$ in Figure 22. The brush 78 travels across the zone marked $y$ in Figure 22 and the brush 79 travels across the zone marked $z$. The brushes 80 and 81 at no time come in contact with the insulation 75ᵃ, but are at all times in contact with the metallic plate 76 and, in the case of brush 81, with insulation at 126.

As will be seen from Figures 2 and 16, the housing or column H for the steering wheel W has an enlargement at $h$ formed to define an annular chamber $h'$. The hub $w$ of the steering wheel W rests upon the outer wall of the enlargement $h$ and rotates thereon. This steering wheel is, of course, connected to the usual steering wheel shaft. Mounted upon the enlargement $h$ of the steering column are six brushes designated 86, 87, 88, 89, 90 and 91, respectively. These brushes have the same construction as is shown in Figure 10, and one of the brushes is illustrated in detail in Figure 17, and the outer sleeves of these brushes are mounted in an insulating plate 92. Carried by the steering wheel and rotating therewith is an insulating plate 93 carrying upon its under face six metallic rings 86ᵃ, 87ᵃ, 88ᵃ, 89ᵃ, 90ᵃ and 91ᵃ, against which the brushes press. Leading from these six contact rings are wires 115, 116, 114, 118, 121 and 125, which lead to the push button switches 94, 95, 96 and 97, as will be later more fully described, and as best shown in Figure 16. In Figure 22, these switches are diagrammatically shown. These brushes 86 to 91 and their corresponding rings are merely to provide for electrical connection at all times between the switches 94 to 97 mounted upon the steering wheel and the contacts 77 to 81, shown in Figure 22. Therefore, these contacts and rings are not illustrated in Figure 22.

As shown in Figure 2, there are a pair of switch buttons mounted at diametrically opposite points with relation to each other on the wheel W. As shown in Figure 18, one of these switch buttons designated 94 is for the purpose of causing the signal arm to move from an indicating position to a neutral or normal position when depressed. The other of this pair of switch buttons is designated 95 and, when depressed, causes the arm to move to a position indicating a right turn. As shown in Figure 19, a switch button 96 is provided for the purpose of causing the arm, when the button is depressed, to move to a position indicating a left turn, and the other of this pair of buttons, when depressed, is intended to cause an indication that the machine is about to slow down. The normal position of the arm is vertical. When the button 97 is depressed, the arm moves from its vertical position through an arc of approximately 45°. When a left turn is being indicated, the arm moves from a slow position to an angle of approximately 90° so that the arm stands out straight under these circumstances, and when a right turn is indicated, the arm moves upward to a position again at 45° to the vertical and extending upward and outward. None of these several positions of the arm are illustrated for the reason that this system of indicating "slow", "left turn" and "right turn" is common and well known.

As shown in Figure 18, each of the buttons 94 and 95 extend down through an insulating plate 98 and the buttons 96 and 97 extend down through an insulating plate 99. Each of these buttons at its lower end extends into a sleeve or socket 100 wherein is disposed a compression spring 101 which urges the button upward. For the sake of clearness, I have designated the several sleeves by the numerals 100, 100ᵃ, 100ᵇ and 100ᶜ, these sleeves being indicated diagrammatically in Figure 22. All of these sleeves, as indicated in Figure 22, are electrically connected to a ground 102 so that when any of the buttons are depressed, they connect through the contact 77 to 81, the motor with a ground. The motor 48 is connected through certain switches and conductors, to a wire with a source of current 104 and to the ground 105. A single lamp 11 is shown in Figure 22, this being connected at one side to a ground 106 and on the other side by a wire 107 to a resilient switch arm 108 which, when the slide 36 is in its normal position, is engaged by the end of the slide and lifted from its electrical engagement with the contact 109, this contact being connected by a wire 110 to a resilient contact 111 which is adapted to coact with the contact 112 connected by a wire 113 to the wire 103 between the battery 104 and the motor. It will thus be seen, by reference to Figures 9 and 22, that when the motor is not operating, the pin 56 will be forced outward, forcing the contact 111 into engagement with the contact 112 and partly closing the circuit to the lamp. When the slide 36 moves away from its normal position, the resilient contact 108 comes in engagement with the contact 109 and completes the circuit to the lamp at this point, but inasmuch as at this time the motor is operating, the circuit is broken at 111 and 112 by the withdrawal of the pin 56 so that the circuit to the lamp is broken at this point until the motor stops running. In other words, normally the lamp 11 (and this is equally true of the lamp 12) is de-energized and the lamps remain de-energized until the signal arm has been shifted to its indicating position and the motor has come to a standstill and then, and only then, can the lamps be energized. As soon as the motor begins to move in a reverse direction to bring the parts back to normal, the circuit to the lamp is again broken at the points 111 and 112, and when the parts have reached a normal position, while the circuit is closed at the contacts 111 and 112, it is broken between the arm 108 and the contact 109 and the lamp is again de-energized.

As will be seen best from Figure 22, the push button 97 which causes the indication of a slowing down of the machine is connected by a wire 114 to the brush 77. The push button 96 which is depressed to indicate a left turn is connected by the wire 115 to the brush 78. The push button 95, which is used to cause an indication of a right turn, is connected by the wire 116 to the brush 79. The push button 94, which is designed to return the parts to neutral position, as shown in Figure 20, carries upon it a metallic contact 117 which, when the push button is depressed, engages the corresponding sleeve 100, this contact 117 being connected by the wire 118 to one side of the motor field 48ᵃ, while from the other side of the field a wire 119 extends to the brush 80. Attached to a metal plate 120 carried by the insulation 98 is a wire 121 which leads to one of the armature brushes of motor 48, thence by the other brush to the wire 103 and carried by this plate 120 is a resiliently lifted contact 122 having insulation 123 upon its upper face, with which insulation the member 117 engages when the button 94 is depressed, thus depressing the contact 122 into engagement with an insulated contact 124 which is connected by a wire 125 with the brush 81. This brush 81 normally projects against an insulated surface 126 in the metallic face plate 76, as shown in Figure 22. Assuming that the parts are in the full line position shown in Figure 22, then the neutral button 94 is raised by its spring against the contact 120.

If it be now desired to show a signal indicating a slowing down of the machine, the button 97 is depressed. The current from the battery 104 passes by way of wire 103 through the armature to wire 121 and thence to the plate 120, thence to contact 117, thence by way of wire 118 to the motor field through the field to wire 119, thence to the brush 80 and through the metallic plate 76 to the brush 77, thence by way of wire 114 to the depressed button 97, and thence by way of sleeve 100c to the ground 102, and thence, of course, back to the ground 105, thus completing the circuit through the motor. The motor shifts the slide 36 toward the left in Figure 22 until such time as the contact 77 runs on to the insulation 75ª which, of course, automatically breaks the circuit through the motor, and the slide 76 stops. Movement of the slide 76 to this extent pulls downward on the rack 25, rotating the gear wheel 21 to an extent which will bring the arm to the "slow" position extending downward and outward at an angle of approximately 45°. When the arm has been brought to the desired position, the pressure on the switch button 97 is released and the motor has ceased to operate, of course, the arm will remain in its "slow" indicating position.

If now it is desired to bring the arm back to neutral, the direction of current through the field 48ª must be reversed. To this end, the neutral button 94 is depressed. This causes the current from the battery 104 to pass by way of wires 103 and 121 to contact 120, thence by contact 122 and 124 by wire 125 through contact 81 to the metallic plate 76, thence to the brush 80, then by wire 119 to and through the field 48ª back by wire 118 to the contact plate 117, and thence to the ground 102, thus completing the circuit through the motor in the reverse direction, causing the return of the plate 76 to its normal position, this movement of the motor stopping automatically when the brush 81 contacts with the insulation 126, thus breaking the circuit to the motor.

If it be desired to indicate a "left turn", the button 96 is depressed, thus closing the circuit from the battery through wires 103 and 121 to contacts 120 and 117 to wire 118 to the field 48ª back through wire 119 to brush 80, thence to the brush 78 by way of the plate 76, back through wire 115 to sleeve 100b, and thence to the ground. This causes the motor to operate in a direction to shift the slide 36 toward the left in Figure 22, until the brush 78 is engaged by the insulation 75ª. Then, of course, the motor stops, holding the arm in the "left turn" indicating position. The arm is returned to neutral by depressing the button 94, as previously described.

If a turn to the right is to be indicated, the button 95 is depressed, thus closing the circuit from the battery through wires 103 and 121, contacts 120 and 117, wire 118 to the field, back through wire 119 to the brush 80, from brush 80 over the metallic plate 76 to the brush 79, and thence by wire 116 to the contact carried by the button 95, thence to the sleeve 100ª, and thence to the ground 102. The moment that the slide 36 starts to move to the left, the switch formed of the parts 108 and 109 is closed, but the motor throws out the weights of governor 51 and this retracts the pin 56, breaking the circuit between 111 and 112, but when the slide 36 has reached its selected position and the motor stops, the contacts 111 and 112 close against each other under the action of the springs 52 and the circuit is completed through the lamps 11 and 12. The lamps remain illuminated until the motor is reversed to reverse the motion of the slide 36, whereupon the lamps go out and remain out until the next indicating signal is to be given.

It will be seen that I have provided a signal indicating mechanism which is very simple as regards its circuits and which positively indicates the selected movement of the car. It will be seen that the control buttons whereby the signal is controlled are mounted upon the wheel in a convenient position for actuation by the driver. It will be seen that with this structure also that the driver can, by depressing the neutral button, cause the return of the signal arm to any desired position. In other words, he depresses the neutral button until the arm has returned to the position indicating the direction in which he has finally decided to go, thus permitting the driver to indicate, for instance, a "right turn" and then, if he changes his mind, indicating a "left turn" or "slow".

While I have illustrated certain details of construction and arrangement of parts, I wish it understood that many minor changes might be made without departing from the spirit of the invention, as defined in the appended claims.

What is claimed is:—

1. In a signalling mechanism, a movable element, a reversible electric motor, means operatively engaging the motor with the movable element to shift the latter, the element being shiftable by the motor from a neutral to any one of a plurality of active positions and upon a reversal of the motor being shiftable to a neutral position, a signal arm movable to a plurality of selected positions, means operatively connecting the signal arm with said element, a signal lamp carried by the arm, a source of current therefor, a circuit including the source of current and the lamp, two switches in said circuit, means actuated by the motor when moving opening one of said switches, a stoppage of the movement of the motor closing the said switch, means constructed and arranged to act upon a movement of the movable element under the actuation of the motor away from its neutral position to automatically close the other switch in the lamp circuit, the return of the movable element to its neutral position opening the last named switch.

2. In a signalling mechanism, a signalling arm movable in a vertical plane from a neutral fully lowered position to a plurality of raised positions, an electric lamp carried thereby, an electric motor, means operatively connecting the motor to the arm to operate it, a source of potential, a plurality of circuits including the motor and the source of potential, a plurality of manually operable switches each controlling the passage of current through one of said circuits and through the motor in a direction to cause the motor to lift the arm, a manually operable switch controlling the passage of current through the motor from the source of potential in a reverse direction to thus return the arm to its initial fully lowered position, a shiftable element, means operatively connecting the element with the motor to shift the element in one direction or the other as the motor is operated in one direction or the other, said element as it is shifted in one direction automatically breaking the motor circuit previously established by the closing of the corresponding switch and after a predetermined movement of the motor, a lamp circuit interrupted at two points, means operated by the movable element constructed and arranged to automatically break the lamp circuit at one point when the motor has shifted the signal arm to its initial fully lowered position, said means automatically closing the circuit at this point immediately that the motor moves the signal arm from its fully lowered position, a switch normally closing the lamp circuit at the other point and urged to closed position, and means actuated by the motor when operating constructed and arranged to open the last named switch and hold it open against the action of the urging means until the motor stops.

3. A vehicle signal including a signal arm movable from a neutral position to any one of a plurality of selected signalling positions, an electric motor having a field winding, means operatively connecting the motor to the arm to shift the latter, a plurality of manually operable switches connected each by conductors in a normally open circuit with the motor and adapted to close the circuit through the motor and a source of current, each switch when closed operating the motor to shift the arm to a predetermined signalling position, means for automatically breaking the circuit through the motor and the actuated switch when the arm has reached its predetermined position, a manually operable switch electrically connected to the motor and the source of current and when operated closing a circuit in a reverse direction through the motor to return it to its initial position, means for automatically breaking the last named circuit through the motor when the arm has reached its initial neutral position, an electric lamp carried by the arm, and means for automatically closing a circuit through the lamp and the source of current when the motor has ceased to rotate and the arm has reached its selected predetermined signalling position and automatically breaking said last named circuit immediately that the motor begins to operate and to return the arm to its initial position.

WILLIAM ROSS.